United States Patent Office 3,775,487
Patented Nov. 27, 1973

---

3,775,487
PROCESS FOR PREPARING PHENOL
Bernard Isbitsky, Jr., Garfield, Jack M. Solomon, West Caldwell, and Bernard R. Bluestein, Glen Rock, N.J., assignors to Witco Chemical Company, Inc., New York, N.Y.
No Drawing. Filed June 6, 1968, Ser. No. 734,880
Int. Cl. C07c 37/06
U.S. Cl. 260—621 H                                    5 Claims

ABSTRACT OF THE DISCLOSURE

Process of preparing phenol from cyclohexanol or cyclohexanone, or mixtures thereof, by passing the same, in the vapor phase at atmospheric pressure, over a heated nickel oxide-copper oxide catalyst.

---

Our invention is directed to an improved process for preparing phenol from cyclohexanol or cyclohexanone, or mixtures thereof.

Processes for the preparation of phenol from cyclohexanol or cyclohexanone, broadly speaking, have long been known and have been disclosed in various patents and other publications. In such processes, cyclohexanol or cyclohexanone is passed over a heated catalyst, as is shown in U.S. Pat. Nos. 2,291,595; 2,588,359; 2,628,985; 2,640,-084; 2,708,208; 3,194,843; 3,194,844 and 3,256,348. While various of said processes produce good yields of phenol, in general such procedures possess one or more disadvantages in that they require the utilization of high reaction temperatures or long reaction times, or they require the use of relatively expensive catalysts.

The process of our present invention has a number of advantages in that it produces excellent yields of phenol from cyclohexanol or cyclohexanone or mixtures thereof such as commonly result from the oxidation, for instance, the molecular oxygen, such as air, oxidation of cyclohexane in the liquid phase, as shown, for instance, in U.S. Pats. Nos. 2,223,494 and 2,557,281. The unreacted cyclohexane and other byproducts are removed by known procedures and the cyclohexanol-cyclohexanone mixtures commonly contain approximately 55% cyclohexanol and about 45% cyclohexanone. Such mixtures, as so produced, provide an excellent starting material or feedstock for our process. However, mixtures, generally, of cyclohexanol and cyclohexanone can be used as well as substantially pure cyclohexanol or cyclohexanone. Our process has the further advantages of being carried out at relatively low temperatures and at substantially atmospheric pressure. The catalyst which is utilized, which is a mixture of nickel oxide and copper oxide, supported or unsupported, is readily prepared and is economical in cost and produces high yields of phenol.

The nickel oxide-copper oxide catalyst can be prepared in various ways and with variable contents of nickel and copper, generally in the range of 1 to 5%, advantageously 3 to 4% nickel; and from 0.1 to 0.5%, advantageously about 0.2% copper. One illustrative procedure for producing a suitable nickel oxide-copper oxide catalyst is as follows:

Nickel nitrate plus 0.1% (based on the weight of the nickel nitrate) copper nitrate is dissolved in a minimum amount of distilled water which is then added to 95% by weight of activated alumina. The mixture is heated, with stirring, until dry and heated at 600° F. for from 2 to 4 hours to effect activation.

The contact times between the cyclohexanol and/or cyclohexanone and the catalyst are variable but, in general, are of short duration, generally in the range of 1 to 30 seconds. In most cases, contact times of from about 5 to 15 seconds are satisfactory, with about 10 seconds being particularly desirable, depending, however, on the specific activity of the catalyst and the temperature at which the reaction is carried out. Reaction temperatures will, in the usual case, range from about 300 to 700° F., advantageously from about 400 to 500° F. with about a range of 475° F.–525° F. being substantially optimum in most cases. Unreacted material can, of course, be recycled.

The following examples are illustrative of the practice of the process of our invention but are not to be construed in any way as limitative thereof since various changes may be made in the light of the guiding principles and teachings contained herein.

EXAMPLE 1

Cyclohexanol is vaporized and passed at atmospheric pressure into contact with a nickel oxide and copper oxide catalyst on an activated alumina carrier (about 4% nickel and about 0.2% copper) at a temperature of about 500° F. for a period of about 10 seconds. Conversion is about 80% with selectivity to phenol being about 65%.

EXAMPLE 2

The process described in Example 1 is carried out except that the feedstock is cyclohexanone. Conversion is about 65% with selectivity to phenol being about 65%.

We claim:

1. A process for the preparation of phenol which comprises passing a feed consisting essentially of a member of the group consisting of cyclohexanol and cyclohexanone, and mixtures thereof, in the vapor phase at substantially atmospheric pressure, over a heated nickel oxide-copper oxide catalyst, at a temperature of from about 400–500° F., said feed being in contact with said catalyst for a period of from about 1 to 30 seconds.

2. The process of claim 1, in which the nickel oxide-copper oxide is carried on activated alumina.

3. The process of claim 2, in which the nickel content of said catalyst is from about 3 to 4% and the copper content is about 0.2%.

4. The process of claim 1, in which the temperature is maintained between about 475 and 525° F.

5. The process of claim 2, in which the temperature is maintained at about 500° F. and the contact time of the cyclohexanol with the catalyst is between about 5 and 15 seconds.

References Cited

UNITED STATES PATENTS

| | | | |
|---|---|---|---|
| 2,588,359 | 3/1952 | Chitwood et al. | 260—621 X |
| 3,340,311 | 9/1967 | Chitwood et al. | 260—621 X |

FOREIGN PATENTS

| | | | |
|---|---|---|---|
| 970,835 | 9/1964 | Great Britain | 260—621 X |

LEON ZITVER, Primary Examiner
N. MORGENSTERN, Assistant Examiner

U.S. Cl. X.R.
252—466, 474